US012535848B2

(12) United States Patent
Nakase et al.

(10) Patent No.: US 12,535,848 B2
(45) Date of Patent: Jan. 27, 2026

(54) MULTI-DIRECTIONAL SIGNAL INPUT DETECTION APPARATUS

(71) Applicant: SHENZHEN ZESUM TECHNOLOGY CO., LTD., Shenzhen (CN)

(72) Inventors: Yusho Nakase, Shenzhen (CN); Xianwu Hu, Shenzhen (CN); Shiying Yang, Shenzhen (CN); Chaoxian Chen, Shenzhen (CN)

(73) Assignee: SHENZHEN ZESUM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/783,907

(22) Filed: Jul. 25, 2024

(65) Prior Publication Data

US 2025/0355458 A1 Nov. 20, 2025

(30) Foreign Application Priority Data

May 20, 2024 (CN) ........................ 202421131567.8

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2009/0474* (2013.01); *G05G 2505/00* (2013.01)

(58) Field of Classification Search
CPC ...... G05G 5/05; G05G 9/047; G05G 2505/00; G05G 2009/0474; G05G 1/503; G05G 1/02; G05G 1/06; G05G 1/08; G05G 1/10; G05G 5/03; H01H 21/22; H01H 21/36
See application file for complete search history.

(56) References Cited

U.S. PATENT DOCUMENTS 5,675,309 A * 10/1997 DeVolpi ................. G05G 9/047 338/68
6,124,555 A * 9/2000 Isikawa .................. G05G 9/047 200/18
2012/0274563 A1* 11/2012 Olsson ................... G05G 9/047 345/161
2013/0207793 A1* 8/2013 Weaber ................... G06F 3/041 340/407.2
2022/0084762 A1* 3/2022 Nakase ................ H01H 25/008

* cited by examiner

*Primary Examiner* — Minnah L Seoh
*Assistant Examiner* — Gregory T Prather
(74) *Attorney, Agent, or Firm* — Westbridge IP LLC

(57) ABSTRACT

A multi-directional signal input detection apparatus includes: a cover provided with an inner cavity and an opening portion communicated with the inner cavity; an operating body configured to be tilted and protrude upward from the opening portion; a first rocker arm and a second rocker arm; a sliding signal detection module configured to detect a rotation of the first rocker arm and the second rocker arm; a pressing plate configured to be in a disk-shape, an open hole is provided at a center of the pressing plate; an elastic member, one end of the elastic member is configured to squeeze an upper surface of the pressing plate against a lower part of the operating body, and the other end of the elastic member is configured to squeeze a bottom surface of the inner cavity to reset the operating body to a neutral position.

11 Claims, 5 Drawing Sheets

MULTI-DIRECTIONAL SIGNAL INPUT DETECTION APPARATUS

CROSS-REFERENCE TO RELATED APPLICATIONS

The present application claims priority to Chinese Patent Application No. 202421131567.8, filed on May 20, 2024, the entire contents of which are incorporated herein by reference.

TECHNICAL FIELD

The present application relates to the technical field of multi-directional input detection apparatus, and in particular to a multi-directional signal input detection apparatus.

BACKGROUND

The rocker multi-directional signal input detection apparatus generally includes a seat, an operating member that can be tilted on the seat, two rocker arms that rotate according to the tilting action of the operating member, a sliding signal detection module, and a circuit board detecting the sliding amount of the two sliding terminals and outputting the corresponding signal. The rocker multi-directional signal input detection apparatus can be used for game control to implement game controllers, VR and other control platforms, and control instructions can be triggered through the rocker.

The existing rocker multi-directional signal input detection apparatus cannot identify whether the user's hand is in contact with the rocker, and thus cannot have better interaction with the user, which is not perfected.

SUMMARY

The main purpose of the present application is to provide a multi-directional signal input detection apparatus, aiming to identify whether the user's hand is in contact with the rocker.

In order to achieve the above purpose, the multi-directional signal input detection apparatus provided in the present application includes:

- a cover provided with an inner cavity and an opening portion communicated with the inner cavity;
- an operating body configured to be tilted and protrude upward from the opening portion;
- a first rocker arm and a second rocker arm, the first rocker arm and the second rocker arm are configured to rotate along a tilting operation of the operating body, and a rotation axis of the first rocker arm is perpendicular to a rotation axis of the second rocker arm;
- a sliding signal detection module configured to detect a rotation of the first rocker arm and the second rocker arm;
- a pressing plate configured to be in a disk-shape, an open hole is provided at a center of the pressing plate;
- an elastic member, one end of the elastic member is configured to squeeze an upper surface of the pressing plate against a lower part of the operating body, and the other end of the elastic member is configured to squeeze a bottom surface of the inner cavity to reset the operating body to a neutral position;
- a circuit board provided below the cover, a touch-sensing pin is provided on a surface of the circuit board; and
- a seat fixed to the cover.

The operating body and the elastic member are made of conductive materials; and one end of the elastic member is abutted against the pressing plate, and the other end of the elastic member is electrically connected to the touch-sensing pin.

In an embodiment, one end of the elastic member is abutted against the pressing plate, and the other end of the elastic member is electrically connected to the seat; and the seat is communicated with an external host.

In an embodiment, one end of the touch-sensing pin is arc-shaped and is provided on a front side, a back side, or both sides of the circuit board.

In an embodiment, the elastic member is a spring, and the elastic member is coaxially provided with the operating body.

In an embodiment, a diameter of the pressing plate is adapted to a diameter of an end surface of the elastic member towards the operating body.

In an embodiment, the multi-directional signal input detection apparatus further includes: a conductive medium provided between the pressing plate and the operating body, the conductive medium is carbon conductive grease, silver paste oil or conductive grease.

In an embodiment, the operating body includes a movable portion and a connecting portion connected to the movable portion, and a diameter of the movable portion is larger than a diameter of the connecting portion; one end of the movable portion connected to the connecting portion is passed through the opening and abutted against the pressing plate; and the connecting portion is passed through the open hole, and one end of the connecting portion away from the movable portion is abutted against the circuit board or the seat.

In an embodiment, the open hole is provided at the center of the pressing plate, and a center line of the open hole, an axis of the operating body and a center line of the elastic member are provided on a same straight line.

In an embodiment, the connecting portion is made of engineering plastic or metal.

In an embodiment, the movable portion and the connecting portion are provided separately, and the connecting portion is combined with the connecting portion through a riveting process or a secondary mold injection molding process.

In an embodiment, the movable portion is integrated with the connecting portion.

In the technical solution of the present application, the multi-directional signal input detection apparatus includes a cover, an operating body, a first rocker arm and second rocker arm, a sliding signal detection module, a pressing plate, an elastic member, a circuit board and a seat. The cover is provided with an inner cavity and an opening portion communicated with the inner cavity. The circuit board is provided in the inner cavity, and the surface of the circuit board is provided with touch-sensing pins. A lower part of the operating body is elastically squeezed by the elastic member to be tilted inside the inner cavity, and the end of the operating body in the inner cavity is electrically connected to the touch-sensing pin. When the user's hand touches the rocker, since the operating body conductive, the hand senses contact with the operating body, and the other end of the operating body is electrically connected to the touch-sensing pin. The touch-sensing pin is triggered by touching the operating body, and the multi-directional signal input detection apparatus receives the information that the user's hand touches the rocker, so as to implement display or interaction functions.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
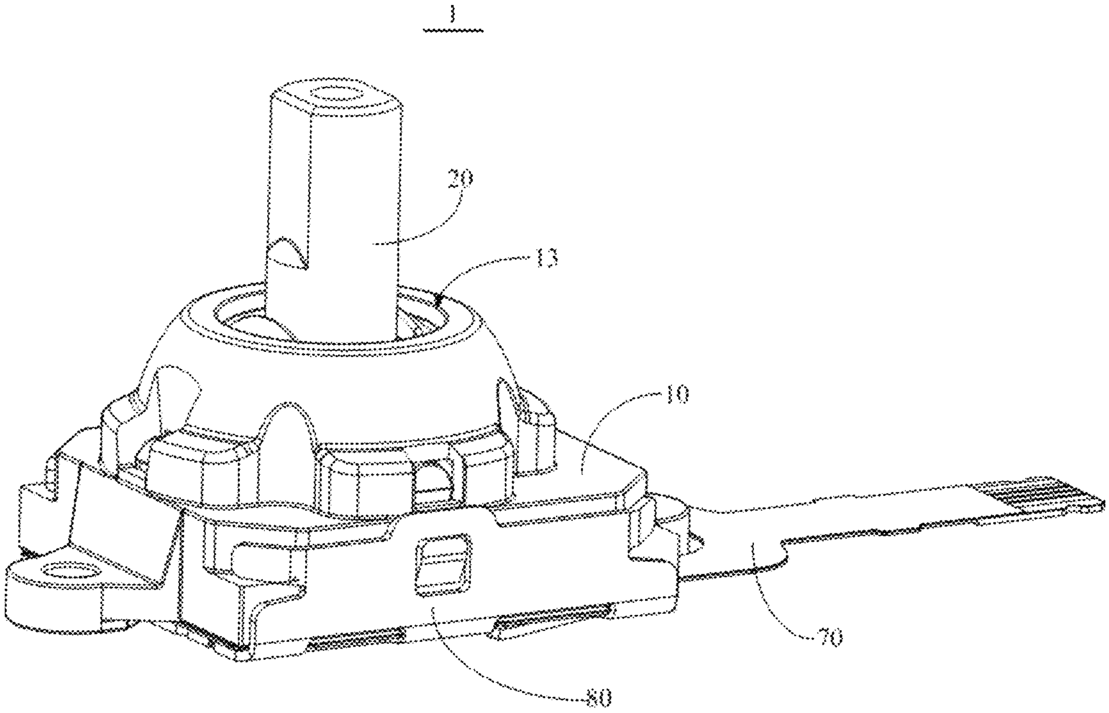
FIG. 1 is a schematic structural view of a multi-directional signal input detection apparatus of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to “first”, “second”, etc. in the embodiments of the present application, the descriptions of “first”, “second”, etc. are only for the purpose of description, and should not be construed as indicating or implying relative importance or implicitly indicates the number of technical features indicated. Thus, a feature delimited with “first”, “second” may expressly or implicitly include at least one of that feature. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a multi-directional signal input detection apparatus 1.

In an embodiment of the present application, as shown in FIG. 1 to FIG. 4, the multi-directional signal input detection apparatus 1 includes a cover 10, an operating body 20, a first rocker arm and second rocker arm 30, a sliding signal detection module 40, a pressing plate 50, an elastic member 60, a circuit board 70 and a seat 80. The cover 10 is provided with an inner cavity 11 and an opening portion 13 communicated with the inner cavity 11. The operating body 20 can be titled and protrude upward from the opening portion 13. The first rocker arm and the second rocker arm 30 rotate along the tilting of the operating body 20, and the rotation axis of the first rocker arm and the rotation axis of the second rocker arm are perpendicular to each other. The sliding signal detection module 40 respectively detects the rotation of the first rocker arm and the second rocker arm 30. The pressing plate 50 is disk-shaped, and the center of the pressing plate 50 is provided with an open hole. One end of the elastic member 60 squeezes the upper part of the pressing plate 50 against the lower part of the operating body 20, and the other end of the elastic member 60 squeezes the bottom surface of the inner cavity 11 to reset the operating body 20 to the neutral position. The circuit board 70 is provided below the cover 10, and the surface of the circuit board 70 is provided with a touch-sensing pin 71. The seat 80 fixes the cover 10, the operating body 20 is made of conductive material, and the end of the operating body 20 in the inner cavity 11 is electrically connected to the touch-sensing pin 71.

The multi-directional signal input detection apparatus 1 includes a cover 10, an operating body 20, a first rocker arm and a second rocker arm 30, a sliding signal detection module 40, a pressing plate 50, an elastic member 60, a circuit board 70 and a seat 80. The cover 10 is provided with an inner cavity 11 and an opening portion 13 communicated with the inner cavity 11. The circuit board 70 is provided on the sidewall of the inner cavity 11 opposite to the opening portion 13, and the circuit board 70 is provided with a touch-sensing pin 71 on the surface towards the opening portion 13. The operating body 20 and the elastic member 60 are both made of conductive materials. The sidewall of the operating body 20 is connected to the first rocker arm and the second rocker arm 30. One end of the operating body 20 is provided in the inner cavity 11, and the other end of the operating body 20 extends outside of the opening portion 13. The pressing plate 50 and the elastic member 60 are provided between the operating body 20 and the circuit board 70. One end of the elastic member 60 is abutted against the other end of the operating body 20, and the other end of the elastic member 60 is electrically connected to the touch-sensing pin 71.

When the user’s hand touches the rocker, since the operating body 20 is a conductor, the elastic member 60 connected to the operating body 20 is also a conductor, and the hand sense contacts the operating body 20. Since the elastic member 60 is electrically connected to the touch-sensing pin 71, that is, the operating body 20 communicates the pressing plate 50 and the elastic member 60 to the touch-sensing pin 71. The operating body 20 is touched and inducted to trigger the touch-sensing pin 71. The multi-directional input detection device 1 receives the information that the user’s hand touches the rocker, thereby enabling display or interaction function. That is, the signal induction path flows from the operating body 20 to the elastic member 60, and then flows to the touch-sensing pin 71 to be communicated with the external host, so as to realize signal interaction. When the user’s hand leaves the rocker, the operating body 20 loses induction and cannot trigger the touch-sensing pin 71. The multi-directional signal input detection apparatus 1 receives the information that the user’s hand leaves the rocker.

The material of the operating body 20 can be conductive plastic, conductive metal, conductive rubber, etc. In this embodiment, the operating body 20 is the conductive rubber. The conductive rubber is made by uniformly distributing conductive particles such as glass silver plating, aluminum silver plating, and silver in silicone rubber. The conductive particles are brought into contact through pressure to achieve good conductive properties. The conductive metal can be stainless steel, iron, etc. The material of the elastic member 60 is stainless steel, iron, etc. The elastic member 60 can be a spring, an elastic piece, a conductive elastic rubber pad, etc. In another embodiment, the operating body 20 is made of plastic, and the outer surface of the operating body 20 is coated with a conductive coating medium. Conducting electricity through the coating medium, the operating body 20 can also achieve the effect of conductive induction.

The pressing plate 50 can, on the one hand, connect the elastic member 60 and the operating body 20, which satisfies the stability of the connection between the elastic member 60 and the operating body 20, thereby ensuring the stability of the conduction; on the other hand, the pressing plate 50 maintains the flatness of the connection surface of the two connections, which ensures that the elastic member 60 can adapt to the swing and rotation of the operating body 20, and the induction effect of the circuit board 70 and the rotating assembly on the operating body 20 is accurately controlled.

The multi-directional signal input detection apparatus 1 in the technical solution of the present application includes a cover 10, an operating body 20, a first rocker arm and second rocker arm 30, a sliding signal detection module 40, a pressing plate 50, an elastic member 60, a circuit board 70 and a seat 80. The cover 10 is provided with an inner cavity 11 and an opening portion 13 communicated with the inner cavity 11. The circuit board 70 is provided in the inner cavity 11. The surface of the circuit board 70 is provided with a touch-sensing pin 71. A lower part of the operating body 20 is elastically squeezed by the elastic member 60 to be tilted in the inner cavity 11. One end of the elastic member 60 presses the upper part of the pressing plate 50 against the lower part of the operating body 20, and the other end of the elastic member 60 is electrically connected to the touch-sensing pin 71 provided on the circuit board 70. When the user's hand touches the rocker, since the operating body 20 is a conductor, and the pressing plate 50 and the elastic member 60 connected to the operating body 20 are also conductors, then the hand senses contact with the operating body 20. Since the elastic member 60 is electrically connected to the touch-sensing pin 71, that is, the operating body 20 communicates the elastic member 60 to the touch-sensing pin 71. The operating body 20 is touched and inducted to trigger the touch-sensing pin 71, and the multi-directional signal input detection apparatus 1 receives the information that the user's hand touches the rocker, so as to realize the display or interaction function.

Figure 5:
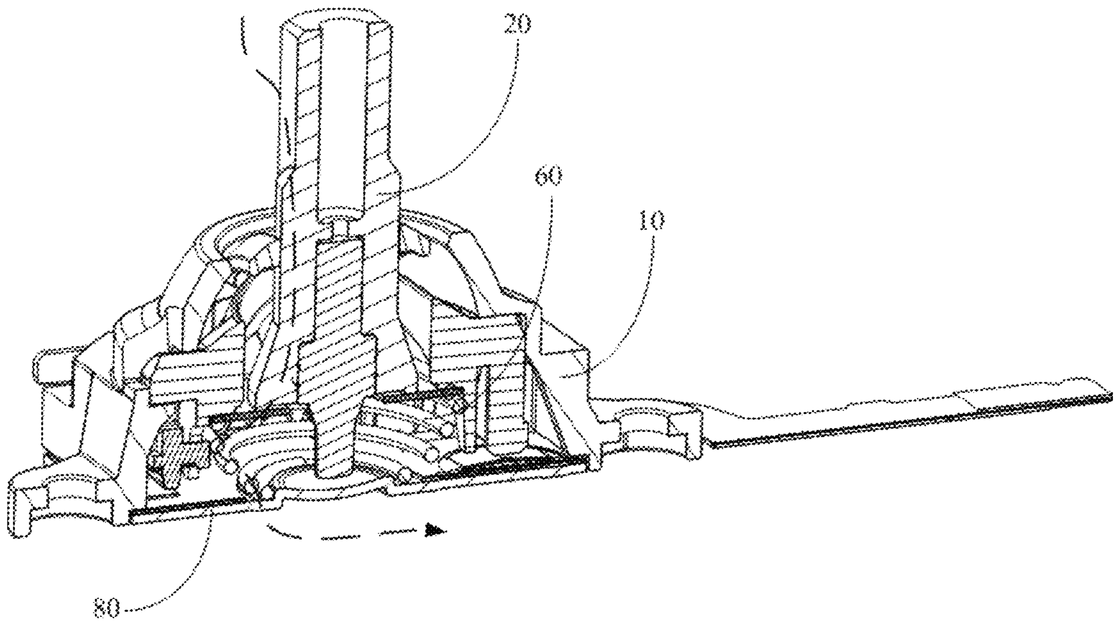
FIG. 5 is a schematic cross-sectional structural view of the multi-directional signal input detection apparatus according to an embodiment of the present application.

In an embodiment of the present application, as shown in FIG. 5, one end of the elastic member 60 is abutted against the pressing plate 50, and the other end of the elastic member 60 is electrically connected to the seat 80, and the seat 80 is communicated with the external host.

In this embodiment, since the seat 80 is a conductor, and the seat 80 is electrically connected to the external host, the signal communication and transmission can be realized through the seat 80 and the external host. The signal induction path flows from the operating body 20 to the elastic member 60, then to the seat 80. The seat 80 is communicated with the external host to achieve signal interaction. This transmission method has the characteristics of high stability and maintains the effectiveness and stability of signal triggering.

Figure 2:
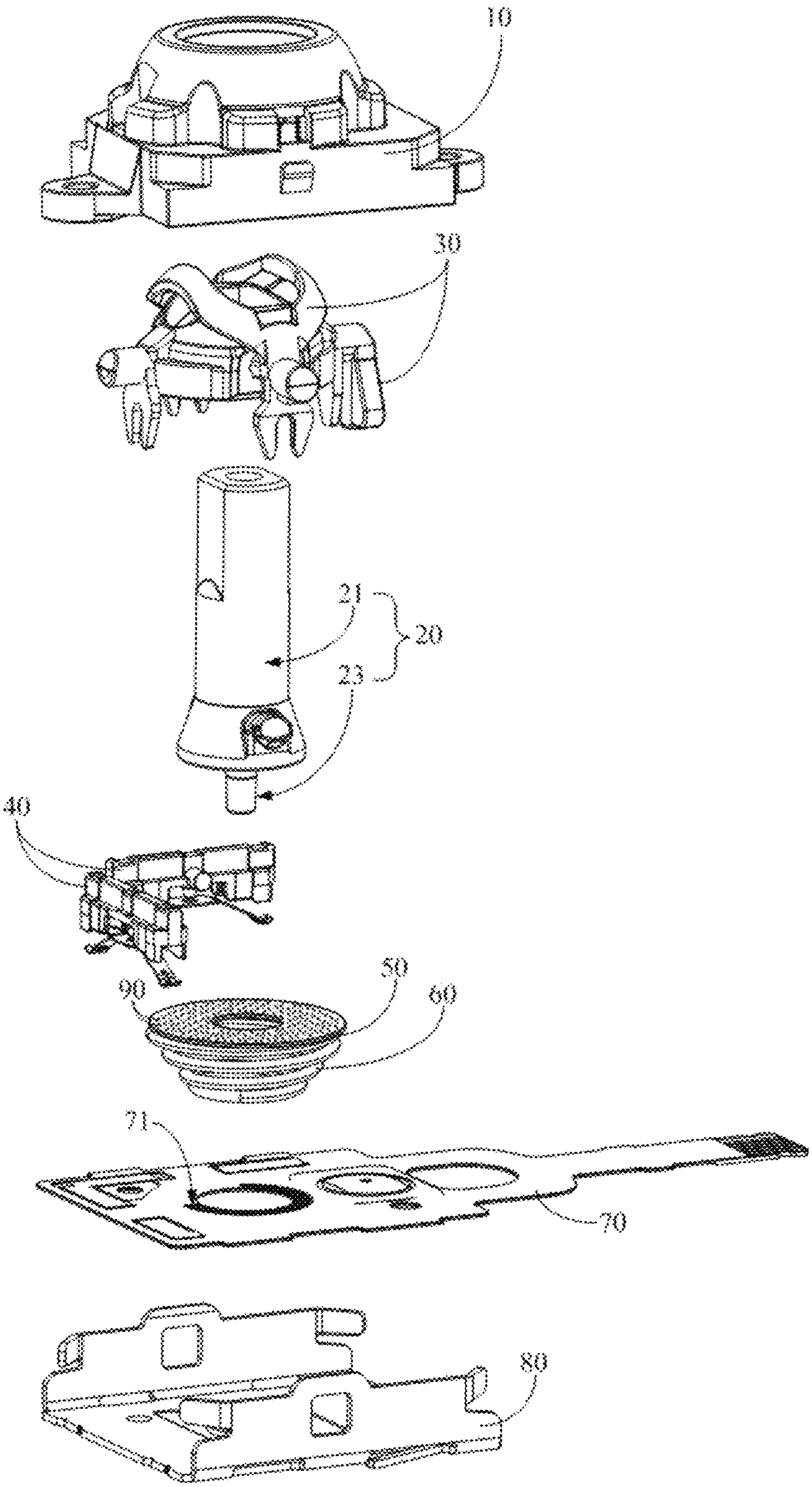
FIG. 2 is a schematic exploded structural view of the multi-directional signal input detection apparatus according to an embodiment of the present application.
Figure 4:
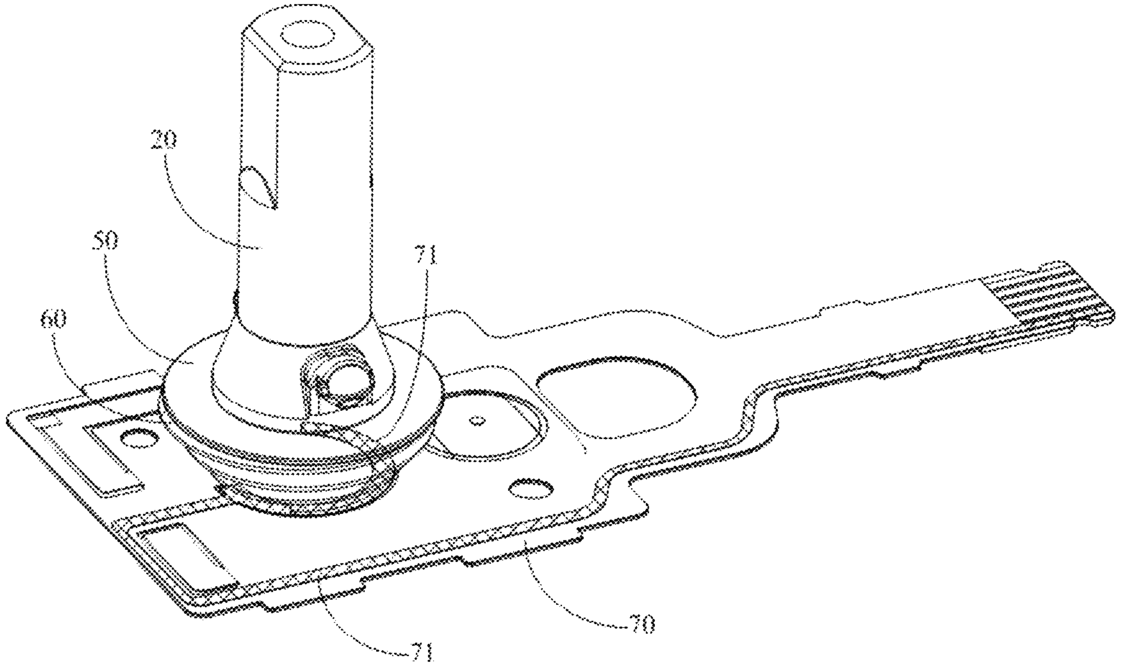
FIG. 4 is a schematic exploded structural view of a rocker assembly and a circuit board in the multi-directional signal input detection apparatus of the present application.

In an embodiment of the present application, as shown in FIG. 2 and FIG. 4, one end of the touch-sensing pin 71 is in an arc shape and can be provided on the front, back, or both sides of the circuit board 70.

The shape of the touch-sensing pin 71 is an arc, and the shape of the touch-sensing pin 71 is adapted to the end shape of the elastic member 60. In this way, the arc can be a semi-arc, or a three-quarter arc, or a quarter arc shape, which is not limited here. The arc-shaped touch-sensing pin 71 can adapt to the end shape of the elastic member 60 when it is a spring, ensuring the induction function of the touch-sensing pin 71 and ensuring the triggering effect of the operating body 20 to the touch-sensing pin 71 through the elastic member 60. Furthermore, the touch-sensing pin 71 can be provided on the front, back, or both sides of the circuit board 70. Therefore, when the touch-sensing pin 71 is provided on the back or both sides, the touch-sensing pin 71 can be electrically connected to the seat 80, and the other end portion of the operating body 20 can be electrically connected to the touch-sensing pin 71 through the connection with the surface of the seat 80. The operating body 20 is touched and inducted to trigger the touch-sensing pin 71 through the conduction of the seat 80.

In an embodiment of the present application, as shown in FIG. 1 to FIG. 4, the elastic member 60 is a spring, and the elastic member 60 is coaxially provided with the operating body 20.

As shown in FIG. 2 and FIG. 4, the diameter of the pressing plate 50 is adapted to the diameter of the end surface of the elastic member 60 towards the operating body 20.

In this embodiment, the elastic member 60 is a spring, and the elastic member 60 and the operating body 20 are coaxially provided. In this way, the elastic member 60 and the operating body 20 can move synchronously, the swing and rotation of the operating body 20 can be adapted, and the induction effect of the circuit board 70 and the rotating assembly on the operating body 20 is accurately controlled.

Further, the diameter of the pressing plate 50 is adapted to the diameter of the end surface of the elastic member 60 towards the operating body 20, which satisfies the stability of the connection surface between the elastic member 60 and the operating body 20, thereby ensuring the stability of conduction; on the other hand, it maintains the flatness of the connection surface between the two connections, ensuring that the elastic member 60 can adapt to the swing and rotation of the operating body 20, and the induction effect of the circuit board 70 and the rotating assembly on the operating body 20 is accurately controlled.

Figure 3:
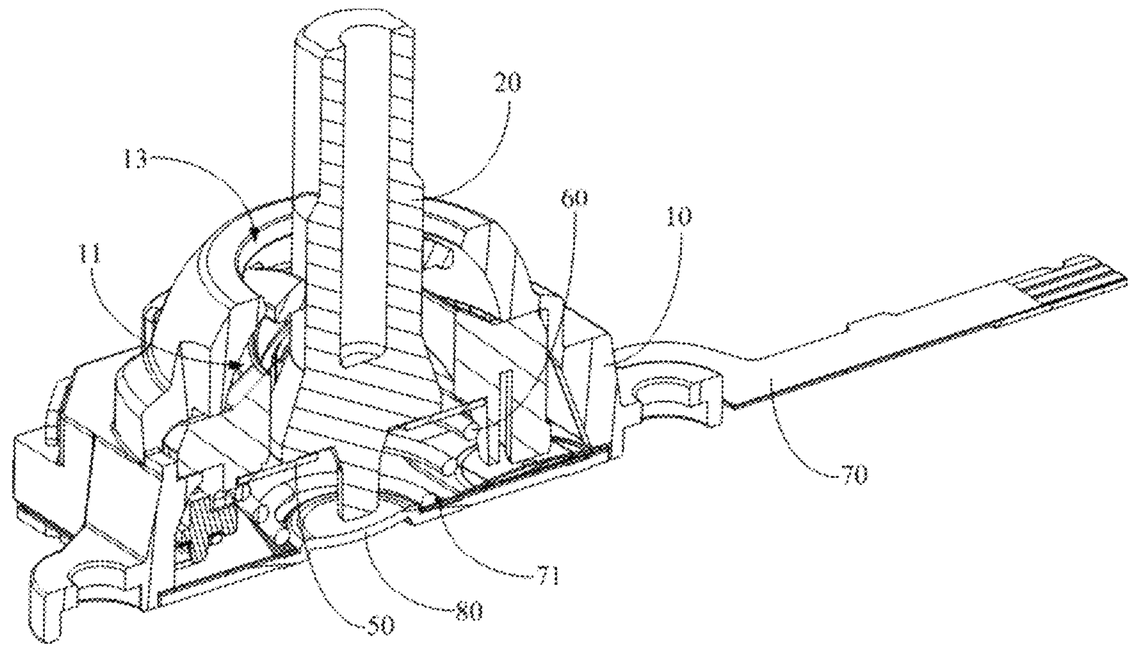
FIG. 3 is a schematic cross-sectional structural view of the multi-directional signal input detection apparatus according to an embodiment of the present application.

In an embodiment of the present application, as shown in FIG. 2 to FIG. 4, the multi-directional signal input detection apparatus 1 further includes a conductive medium 90 provided between the pressing plate 50 and the operating body 20. The conductive medium 90 is carbon conductive grease, silver paste oil or conductive grease.

The conductive medium 90 is provided between the pressing plate 50 and the operating body 20. The conductive medium 90 can be provided on the end surface of the movable portion 21 towards the pressing plate 50, or can be provided on a side surface of the pressing plate 50 towards the movable portion 21, or the conductive medium 90 can be provided on both surfaces of the movable portion 21 and the pressing plate 50 towards each other. It can be understood that the setting of the conductive medium 90 can increase the conductive performance between the operating body 20 and the pressing plate 50, thereby improving the stability of conduction.

In an embodiment of the present application, as shown in FIG. 2 to FIG. 4, the pressing plate 50 is provided with an open hole 51, and the operating body 20 includes a movable portion 21 and a connecting portion 23 connected to the movable portion 21. The diameter of the movable portion 21 is larger than that of the portion 23. One end of the movable portion 21 connected to the connecting portion 23 is passed through the opening portion 13 and abutted against the pressing plate 50. The connecting portion 23 is passed through the open hole 51, and the end of the connecting portion 23 away from the movable portion 21 is abutted against the circuit board 70 or the seat 80.

The operating body 20 includes a movable portion 21 and a connecting portion 23 connected to the movable portion 21. The diameter of the movable portion 21 is larger than the diameter of the connecting portion 23. One end of the movable portion 21 connected to the connecting portion 23 passes through the opening portion 13 and is abutted against the pressing plate 50. The connecting portion 23 is passed through the open hole 51, which satisfies the stability of the connection surface between the elastic member 60 and the operating body 20, thereby ensuring the stability of conduction; on the other hand, it maintains the flatness of the connection surface between the two connections, ensuring that the elastic member 60 can adapt to the swing and rotation of the operating body 20, and the induction effect of the circuit board 70 and the rotating assembly on the operating body 20 is accurately controlled.

In an embodiment of the present application, as shown in FIG. 2 to FIG. 4, an open hole 51 is opened in the center of the pressing plate 50, and the center line of the open hole 51, the axis of the operating body 20 and the center line of the elastic member 60 are on a same straight line.

An open hole 51 is provided at the center of the pressing plate 50. The center line of the open hole 51, the axis of the operating body 20 and the center line of the elastic member 60 are on the same straight line. In this way, the operating body 20, the pressing plate 50 and the elastic member are provided at the same connection position, which meets the stability of the connection surface between the elastic member 60 and the operating body 20, thereby ensuring the stability of conduction; on the other hand, the flatness of the connection surfaces of the two connections is maintained, ensuring that the elastic member 60 can adapt to the swing and the rotation of the operating body 20, and the induction effect of the circuit board 70 and the rotating assembly on the operating body 20 is accurately controlled.

Furthermore, the outer diameter of the pressing plate 50 is larger than the diameter of the movable portion 21. In this way, the operating body 20 is not easily separated from the pressing plate 50, ensuring the connection stability between the operating body 20 and the pressing plate 50, thereby ensuring the stability between the elastic member 60 and the connection surface of the operating body 20, thus ensuring the stability of conduction; on the other hand, the flatness of the connection surface between the two connections is maintained, ensuring that the elastic member 60 can adapt to the swing and rotation of operating body 20, and the induction effect of the circuit board 70 and the rotating assembly on the operating body 20 is accurately controlled.

Furthermore, the pressing plate 50 and the elastic member 60 are integrated, which ensures the stability of the connection between the pressing plate 50 and the elastic member 60, thereby ensuring the stability of the connection between the elastic member 60 and the operating body 20, thereby ensuring the stability of conduction; on the other hand, the flatness of the connection surface between the two connections is maintained, ensuring that the elastic member 60 can adapt to the swing and rotation of operating body 20, and the induction effect of the circuit board 70 and the rotating assembly on the operating body 20 is accurately controlled.

Furthermore, the connecting portion 23 is made of engineering plastic or metal, which ensures the electrical conduction effect of the connecting portion 23.

In an embodiment of the present application, as shown in FIG. 2, the movable portion 21 and the connecting portion 23 are separated, and the connecting portion 23 is combined with the movable portion 21 through a riveting process or a secondary mold injection molding; or the movable portion 21 and the connecting portion 23 are integrated.

In this embodiment, the movable portion 21 and the connecting portion 23 can be connected into an integrated structure through a riveting process. The riveting process has the advantages of firm connection, corrosion resistance, fatigue resistance, good sealing, and convenient installation, etc., thus the overall connection between the movable portion 21 and the connecting portion 23 is stable, and the conduction effect between the movable portion 21 and the connecting portion 23 is achieved.

In an embodiment, the movable portion 21 and the connecting portion 23 are combined by a secondary mold injection molding, that is, an integrated structure. The injection molding process has the advantages of low manufacturing cost and good product quality. The movable portion 21 and the connecting portion 23 are integrally molded by injection molding, which has a stable quality, a high precision and a consistency.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A multi-directional signal input detection apparatus, comprising:

a cover provided with an inner cavity and an opening portion communicated with the inner cavity;

an operating body configured to be tilted and protrude upward from the opening portion;

a first rocker arm and a second rocker arm, wherein the first rocker arm and the second rocker arm are configured to rotate along a tilting operation of the operating body, and a rotation axis of the first rocker arm is perpendicular to a rotation axis of the second rocker arm;

a sliding signal detection module configured to detect a rotation of the first rocker arm and the second rocker arm;

a pressing plate configured to be in a disk-shape, wherein an open hole is provided at a center of the pressing plate;

an elastic member, wherein one end of the elastic member is configured to squeeze an upper surface of the pressing plate against a lower part of the operating body, and the other end of the elastic member is configured to squeeze a bottom surface of the inner cavity to reset the operating body to a neutral position;

a circuit board provided below the cover, wherein a touch-sensing pin is provided on a surface of the circuit board; and a seat fixed to the cover;

wherein the operating body and the elastic member are made of conductive materials;

one end of the elastic member is abutted against the pressing plate, and the other end of the elastic member is electrically connected to the touch-sensing pin; and all of the operating body, the elastic member and the touch-sensing pin are conductive, and therefore when a user's hand touches the operating body, the multi-directional signal input detection apparatus receives information that the user's hand is in contact with the operating body.

2. The multi-directional signal input detection apparatus according to claim 1, wherein one end of the elastic member is abutted against the pressing plate, and the other end of the elastic member is electrically connected to the seat; and the seat is communicated with an external host.

3. The multi-directional signal input detection apparatus according to claim 2, wherein one end of the touch-sensing pin is arc-shaped and is provided on a front side, a back side, or both sides of the circuit board.

4. The multi-directional signal input detection apparatus according to claim 3, wherein the elastic member is a spring, and the elastic member is coaxially provided with the operating body.

5. The multi-directional signal input detection apparatus according to claim 3, wherein a diameter of the pressing plate is adapted to a diameter of an end surface of the elastic member towards the operating body.

6. The multi-directional signal input detection apparatus according to claim 1, further comprising:

a conductive medium provided between the pressing plate and the operating body, wherein the conductive medium is carbon conductive grease, silver paste oil or conductive grease.

7. The multi-directional signal input detection apparatus according to claim 1, wherein the operating body comprises a movable portion and a connecting portion connected to the movable portion, and a diameter of the movable portion is larger than a diameter of the connecting portion;

one end of the movable portion connected to the connecting portion is passed through the opening and abutted against the pressing plate; and the connecting portion is passed through the open hole, and one end of the connecting portion away from the movable portion is abutted against the circuit board or the seat.

8. The multi-directional signal input detection apparatus according to claim 7, wherein the open hole is provided at the center of the pressing plate, and a center line of the open hole, an axis of the operating body and a center line of the elastic member are provided on a same straight line.

9. The multi-directional signal input detection apparatus according to claim 7, wherein the connecting portion is made of engineering plastic or metal.

10. The multi-directional signal input detection apparatus according to claim 7, wherein the movable portion and the connecting portion are provided separately, and the connecting portion is combined with the connecting portion through a riveting process or a secondary mold injection molding process.

11. The multi-directional signal input detection apparatus according to claim 7, wherein the movable portion is integrated with the connecting portion.

* * * * *